Oct. 11, 1932.  L. M. HARVEY  1,882,218
FRUIT CLIPPER
Filed May 26, 1930
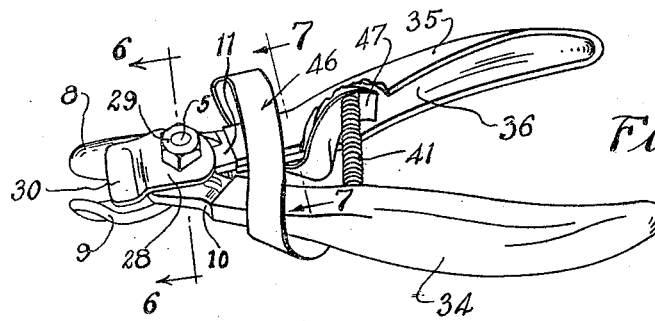
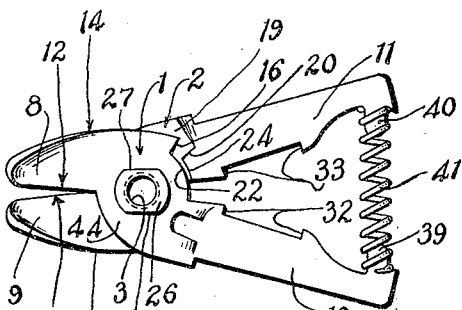
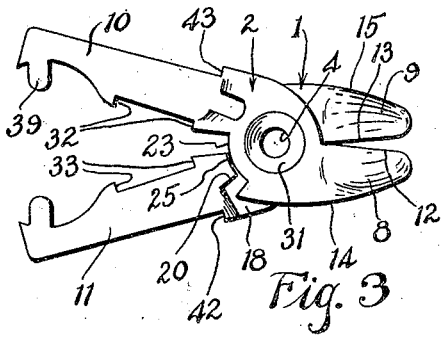
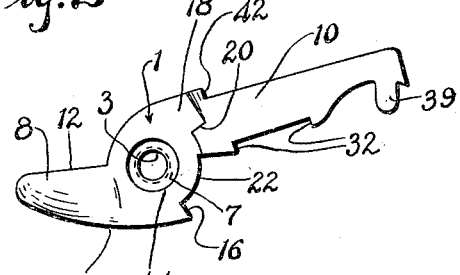
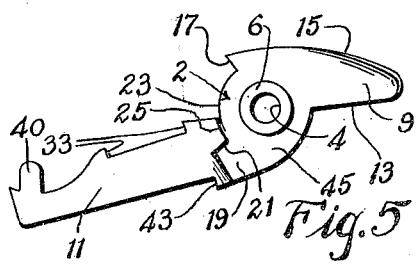
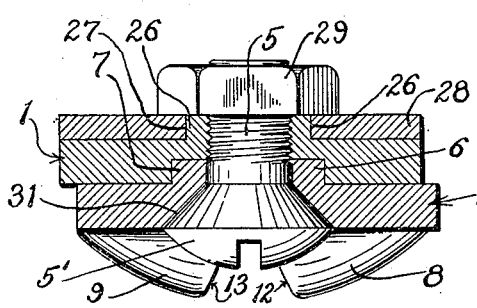
INVENTOR.
Leo M. Harvey
BY
ATTORNEYS.

Patented Oct. 11, 1932

1,882,218

UNITED STATES PATENT OFFICE

LEO M. HARVEY, OF LOS ANGELES, CALIFORNIA

FRUIT CLIPPER

Application filed May 26, 1930. Serial No. 455,811.

This invention relates to fruit clippers, and an object is to provide an improved fruit clipper so designed that the parts thereof may be stamped or forged of metal and more economically manufactured than is possible with the types of clippers now in use.

An object is to provide a fruit clipper arranged in the form of pliers with two main portions hingedly connected together and provided with cupped cutting jaws and handle extensions on opposite sides of the hinge, together with means formed on the sides rather than on the edges, for limiting the opening of the jaws, thus preventing injury to the hands of the operator, which is frequently done in the use of other types of clippers.

Another object is to provide an improved means for attaching the handle to the levers.

A further object is to provide improved means for attaching a spring to the levers for normally urging the jaws into open position.

Another object is to so design the implement that the two levers will be substantially identical in pattern, and thus are adaped to be stamped out of sheet metal by means of the same blanking die, together with means for differently forming the two levers after the blanking operations.

Other objects may appear as the description progresses.

In the accompanying drawing I have illustrated my improvements in the preferred form, in which Fig. 1 is a perspective view of my improved fruit clipper.

Figs. 2 and 3 are, respectively, top and bottom plan views of the two similar members hingedly connected together, with certain portions of the clipper omitted.

Fig. 4 is a bottom plan view of one of the members, and Fig. 5 is a top plan view of the other member of a clipper embodying my improvements showing details of structure.

Fig. 6 is a transverse section of the assembled clipper on line 6—6 of Fig. 1.

Fig. 7 is a transverse section of the same on line 7—7 of Fig. 1.

As shown in the drawing, my clippers include two sheet metal levers 1 and 2, which are similarly formed except for certain details hereinafter mentioned, and have apertures 3 and 4 respectively adapted to receive a hinge screw 5 by means of which said members are pivotally held together. The upper side of member 2 has a circular boss 6 surrounding the aperture 4, while the lower side of member 1 has a corresponding depression 7 which pivotally receives the rib 4.

The members 1 and 2 have correspondingly formed cutting jaws 8 and 9 on the forward ends thereof, and flat handle extensions 10 and 11 respectively rearwardly of the hinge 5. The jaws 8 and 9 have cutting edges 12 and 13 respectively which radiate from the axis of the hinge 5, while the outer edges 14 and 15 of said jaws are arcuately formed and extend to points rearwardly of the hinge 5 where they connect with shoulders 16 and 17 which also radiate from the axis of the hinge.

The lower side of member 1 and the upper side of member 2 are provided, respectively, with correspondingly formed depressions 18 and 19 and shoulders 20 and 21 at the inner extremities of said depressions respectively. Thus the shoulder 16 of member 1 is adapted to engage the shoulder 20 of member 2, and the shoulder 17 of member 2 is adapted to engage the shoulder 21 of member 1, for limiting the opening of the jaws 8 and 9.

The members 1 and 2 are provided inwardly of the shoulders 16 and 17 with arcuate edge portions 22 and 23, which are concentric with the axis of said members, and are movably positioned with respect to correspondingly formed portions 24 and 25 inwardly of the recesses 18 and 19 respectively. The member 1 has a boss 26 on its upper side around the aperture 3, which is provided with flats 27, 27 adapted to receive a stop plate 28. Said plate has an aperture therein formed to correspond to and to seat on the boss 26 and is held in position thereon by means of a nut 29 threaded onto the hinge screw 5. The stop plate 28 has a depressed forward portion 30 which rests above and extends over cutting jaws 8 and 9 so that when the clipper is used for clipping the stems from fruit the portion 30 of plate 28 will limit the movement of the stem into the jaws to a proper position for clipping the stems.

The member 2 is provided on its lower side with a beveled depression 31, which is adapted to receive the head 5' of the screw 5, as shown in Fig. 6. Rearwardly of the hinge the handle extensions 10 and 11 of members 1 and 2 are provided with elongated notches 32 and 33 respectively, said notches being formed on the inner edges of the extensions for non-detachably supporting handles 34 and 35 thereon. The handles are formed of sheet metal and are bent so as to provide recesses at 36 in the outer portions thereof, while the inner portions of the handles are formed over the extensions 10 and 11, as shown in Fig. 7. Each of the handles has a lip 37 extending downwardly and a similar lip 38 extending upwardly over the inner edge of the member 10 or 11 and within the notch 32 or 33 thereof, as the case may be. The handles being thus tightly formed around the extensions 10 and 11 and within the notches 32 and 33 are immovably held on the members 1 and 2.

In this connection it will be observed that the members 1 and 2 are so formed that the extensions 10 and 11 are in the same plane, and said members have lugs 39 and 40 at their inner extremities which receive and support the opposite ends of a compression spring 41.

Shoulders 42 and 43 are provided on the extensions 10 and 11 respectively, against which the inner ends of the handles 34 and 35 abut. It will thus be noted that the two members 1 and 2 are of substantially similar form, and the arrangement, particularly of the shoulders 16—17 and 20—21 at points inwardly of the outer edges of said members, prevents the fingers of an operator being caught therebetween and injured, as in other types of clippers where the limiting shoulders are provided on the outer edges rather than on the flat faces of the levers.

The central portions 44 and 45 of members 1 and 2 respectively are flat so that the two members may swing one on the other, and said portions occupy slightly elevated or depressed planes with respect to the associated portions 10 and 11. The cutting edges 12 and 13 are of course in the same plane, and as hereinbefore stated, the handle extensions 10 and 11 are in the same plane, and in the die forming operation the members 1 and 2 are reversely formed so as to properly position the cutting edges and the handle extensions relative to each other.

When assembled as shown in Fig. 1, spring 41 normally urges the jaws 8 and 9 into open position.

The device is usually held in the palm of the hand with the index finger and thumb overlying the outer edges 14 and 15 of the cutting jaws. The open jaws are then applied to the fruit so that the stems will enter the space between the jaws and the forward portion 30 of the stop plate will abut the stems. The handles 34 and 35 are then moved inwardly against the tension of the spring 41, and cutting edges 12 and 13 of the jaws will clip the stems from the fruit at a point close to the bottom of the pit of the fruit.

The jaws are formed so that they will fit into the pit or depression around the stem, but are sufficiently blunt so that the stem will not be cut too close to the rind. When the pressure on the handles is released the spring 41 will again open the jaws preparatory to another operation.

A strap 46 of leather or other suitable material is attached at its ends 47 on the lugs 39 and 40 beneath the extremities of the spring 41 so that the spring serves to hold the strap in place on the handle. As shown in Fig. 1, the strap is provided with a central loop overlying the upper side of the clippers, while the ends are bent downwardly under the inner ends of the handles and thence upwardly into the recesses 36 of the handles, at which points they are attached to the members 10 and 11, as described and shown. The strap is effective for positioning the implement in the hands of a user and serves to prevent displacement of the implement, and is of great convenient in the use thereof. A particular advantage of the fruit clipper disclosed herein resides in the fact that the outer edges of the levers on which the cutting jaws are formed, as well as the edges which are presented to the hand of an operator, must be smooth and of a continuous and unbroken character.

What I claim is:

1. A fruit clipper comprising a pair of reversely formed complementary sheet metal levers hingedly connected together and provided with flat overlapping axial portions, cutting jaws bent therefrom into opposition on one side of the axis, handle extensions bent in opposite directions from said axial portions into a common plane, said levers formed at the junctions between said handle extensions and said axial portions and on opposite sides with shoulders radially disposed relative to the axis of the levers, said shoulders positioned substantially inwardly of the outer margins of said levers, the outer margins of the axial portions being eccentrically formed and terminating in shoulders inwardly of the axis for engagement with said first mentioned shoulders to limit the spreading of said levers, said axial portions being cut away from said last mentioned shoulders in the direction of the handle extensions to permit the pivotal movement of said levers.

2. A fruit clipper comprising a pair of sheet metal levers adapted to be hingedly connected together and having overlapping flat axial portions with jaws extended therefrom in one direction and handle extensions extended therefrom in an opposite direction, the outer margins of said axial portions being provided with shoulders radially disposed from the axis of the levers, said levers having identical depressions pressed into adjacent faces thereof intermediate the axial portions and said handle extensions and terminating in shoulders radially disposed from the axis of the levers and cooperating with the said peripheral shoulders to limit the spreading of the levers.

LEO M. HARVEY.